March 12, 1946.  H. E. SOMES  2,396,614
WORK HANDLING APPARATUS
Original Filed Feb. 28, 1942   7 Sheets-Sheet 1

INVENTOR
Howard E. Somes.
BY
ATTORNEY

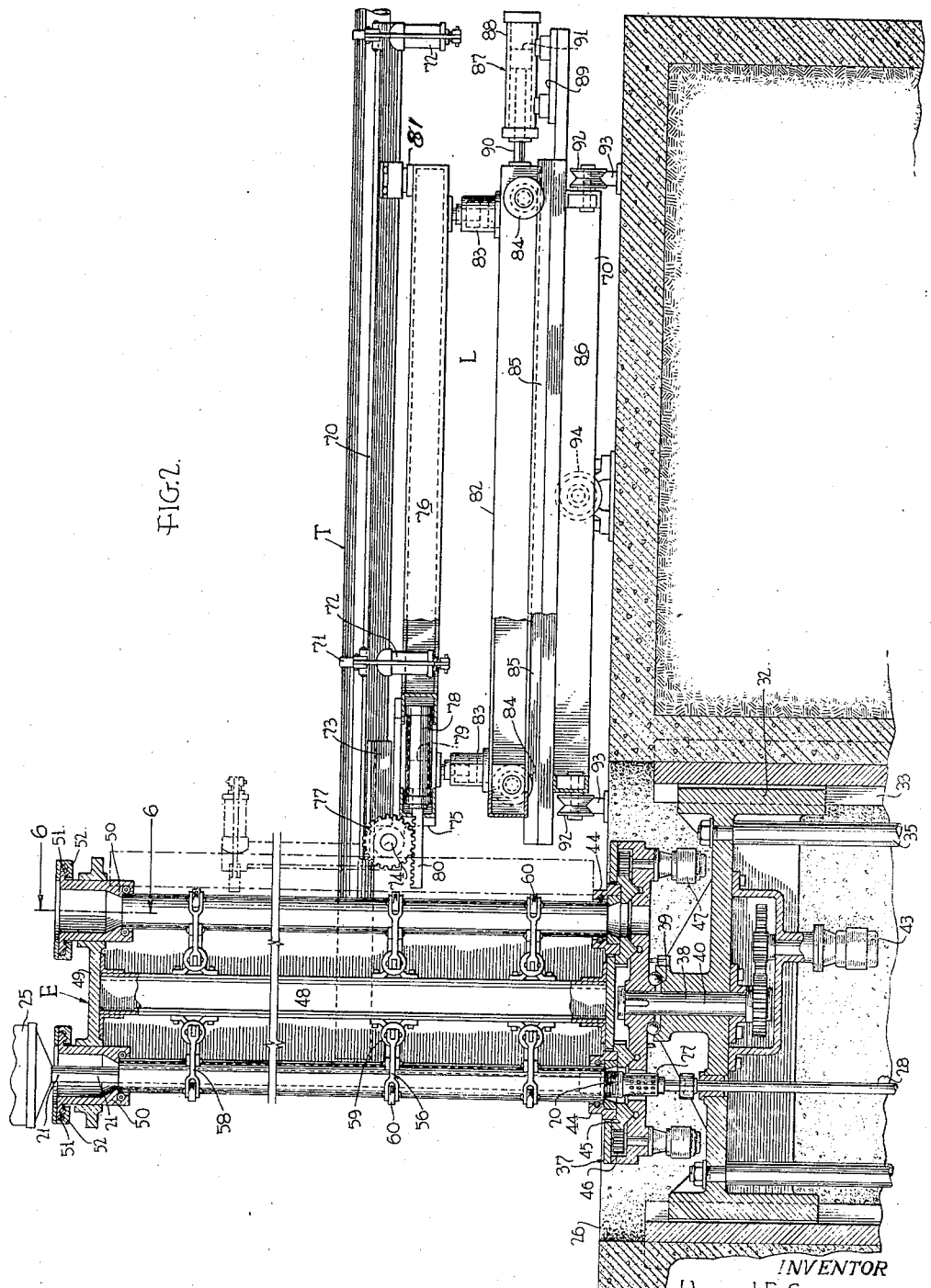

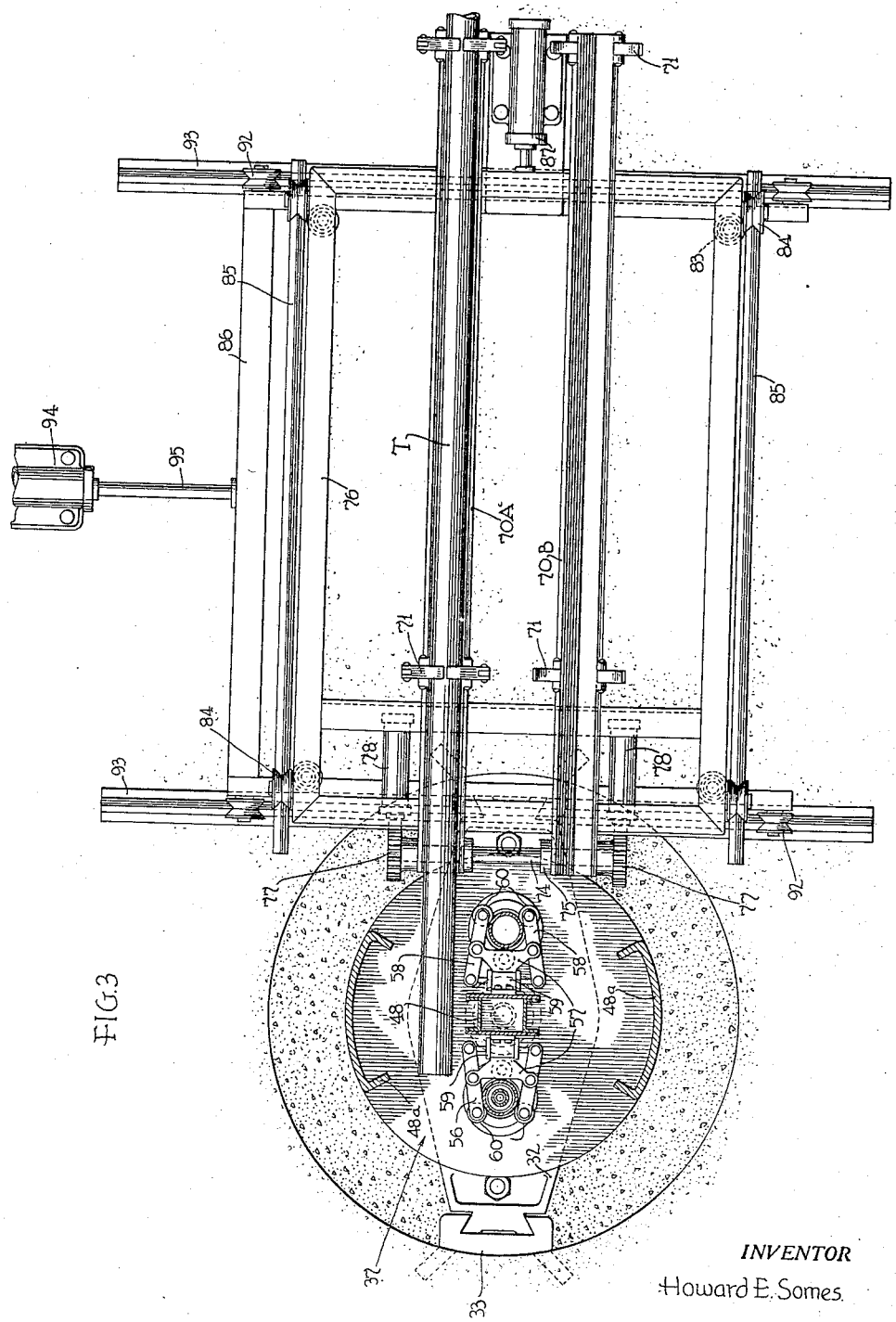

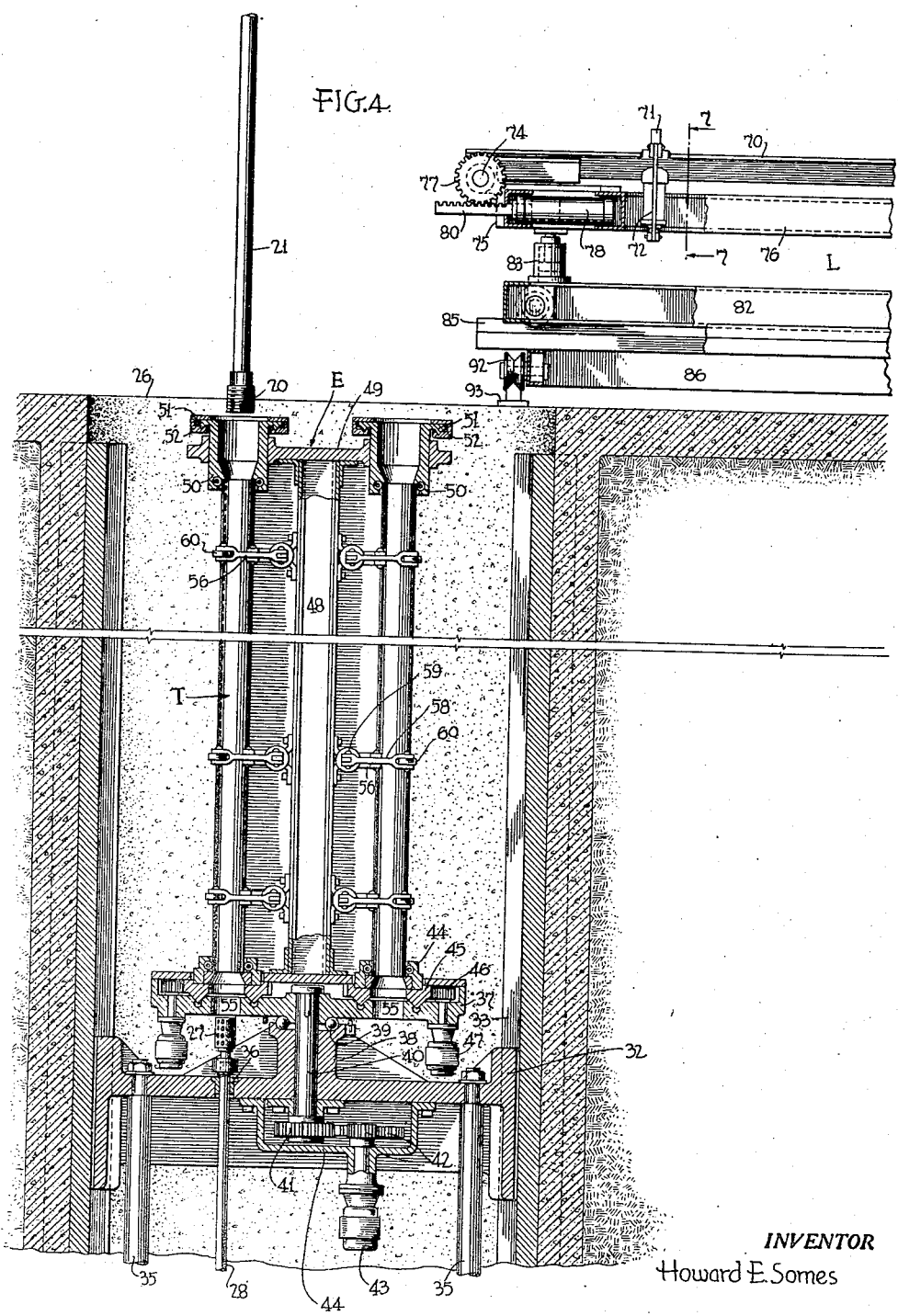

March 12, 1946. H. E. SOMES 2,396,614
WORK HANDLING APPARATUS
Original Filed Feb. 28, 1942  7 Sheets-Sheet 5
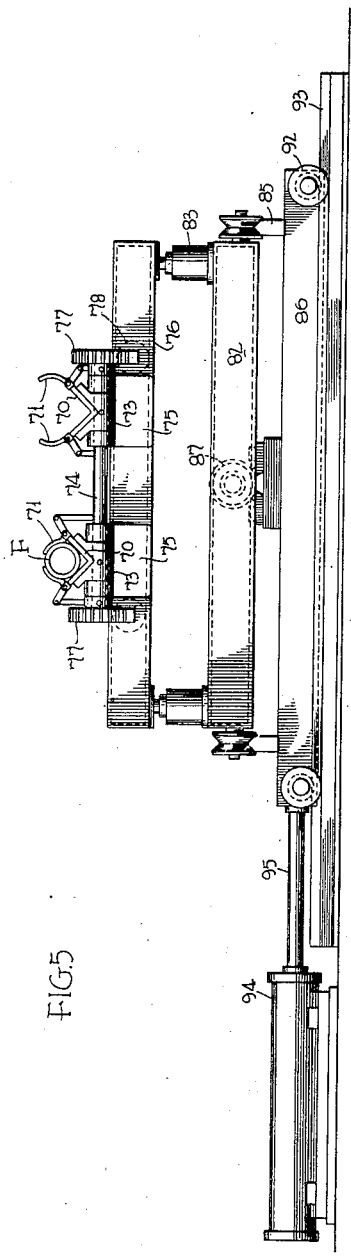
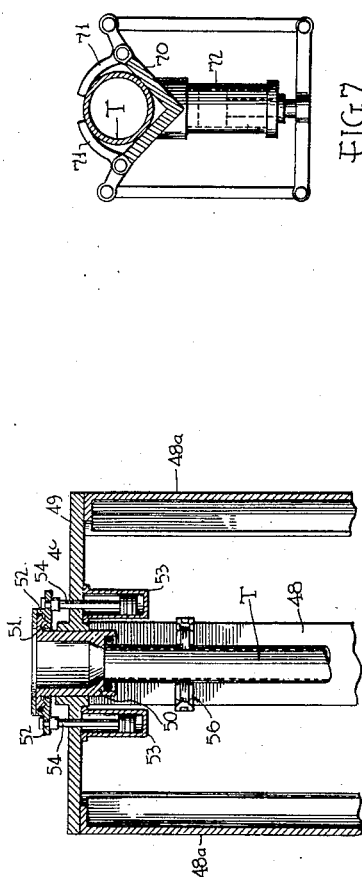
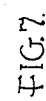
INVENTOR
Howard E. Somes.
BY John P. Tarbox
ATTORNEY March 12, 1946.　　　　H. E. SOMES　　　　2,396,614
WORK HANDLING APPARATUS
Original Filed Feb. 28, 1942　　　7 Sheets-Sheet 6

INVENTOR
Howard E. Somes.
BY John P. Tarbox
ATTORNEY

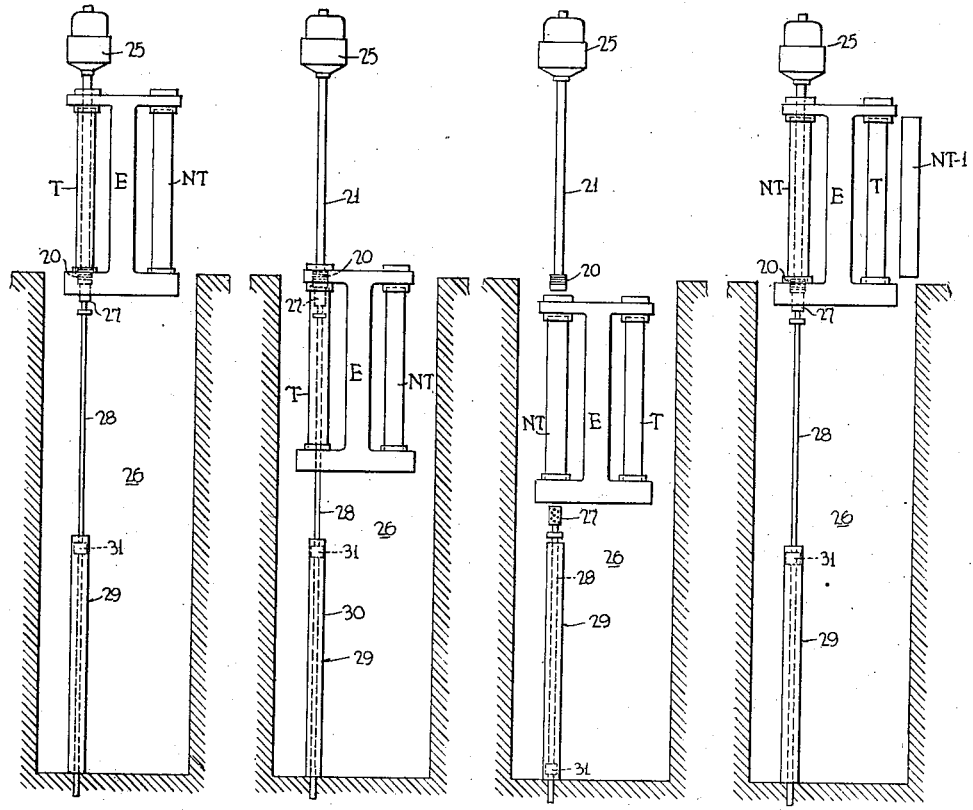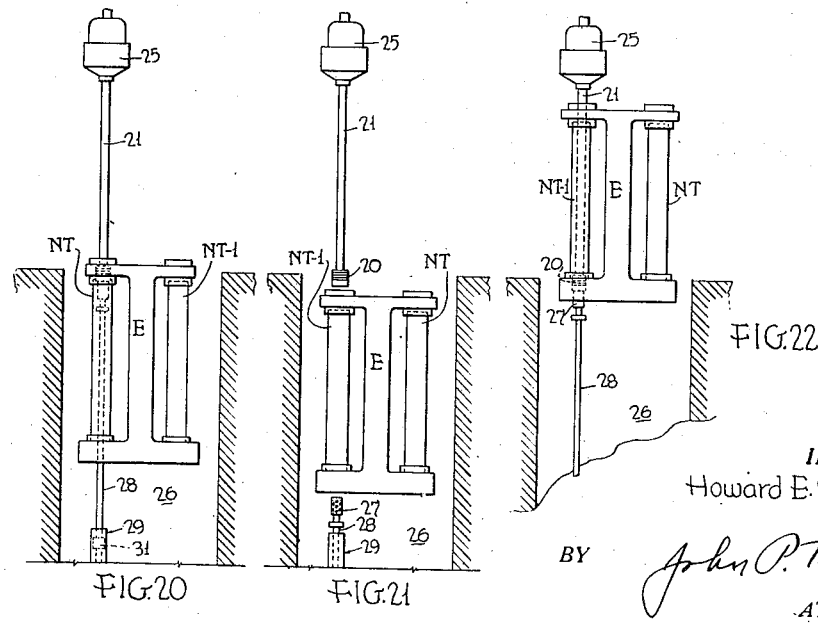

Patented Mar. 12, 1946

2,396,614

UNITED STATES PATENT OFFICE 2,396,614

WORK HANDLING APPARATUS

Howard E. Somes, Detroit, Mich., assignor to Budd Induction Heating, Inc., Philadelphia, Pa., a corporation of Michigan Original application February 28, 1942, Serial No. 432,739, now Patent No. 2,364,924, dated December 12, 1944. Divided and this application May 13, 1944, Serial No. 535,535

1 Claim. (Cl. 214—1)

This invention, the present application for which is a division of my copending application Serial No. 432,739, filed February 28, 1942, now Patent No. 2,364,924, dated December 2, 1944, relates to work handling apparatus, more particularly to apparatus for handling tubular members undergoing internal heat treatment or other operations.

The present invention is directed to apparatus for handling in association with work performing apparatus, relatively long metal tubes or other articles, such as tubes upwards of twenty to fifty feet in length and of various diameters, such as, for example, tubes used for oil casing. Such articles, because of their great weight, are extremely difficult to handle.

One of the objects of the present invention is to provide an efficient and advantageous means for handling articles of this character in connection with apparatus for performing work thereon, which such means is so designed as to facilitate handling of the articles and to minimize delays between the performance of work on successive articles.

Another object is to provide such an apparatus with an improved feeding means and improved mechanism for mechanically loading and unloading the same, which such means and mechanism are so correlated in their movements as to facilitate the handling of the articles to be worked on.

With the above and other objects in view which from the following detailed description will be apparent to those skilled in the art to which the present invention appertains, the present invention consists in certain features of construction and combinations of parts to be hereinafter described with reference to the accompanying drawings, and then claimed.

In the drawings which illustrate a suitable embodiment of the invention:

Figure 1 is a view schematically showing the general arrangement of parts of the present invention;

Figure 2 is a vertical section through portions of the apparatus showing the elevating mechanism in its uppermost position and the loading mechanism in a horizontal position for loading and unloading, it being understood that when the elevating mechanism is in the process of being vertically raised and lowered, the tube-carrying portion of the loading mechanism is in an upright position, as indicated by the broken outline, and withdrawn to the right to clear the elevating mechanism;

Figure 3 is a horizontal section through the elevating mechanism of Figure 2, taken as looking downwardly upon the loading mechanism;

Figure 4 is a view corresponding to Figure 2 but showing the elevating mechanism in its lowermost position;

Figure 5 is an end view of the loading mechanism;

Figure 6 is a vertical section taken approximately on line 6—6 of Figure 2;

Figure 7 is a transverse section taken approximately on line 7—7 of Figure 4;

Figure 1:
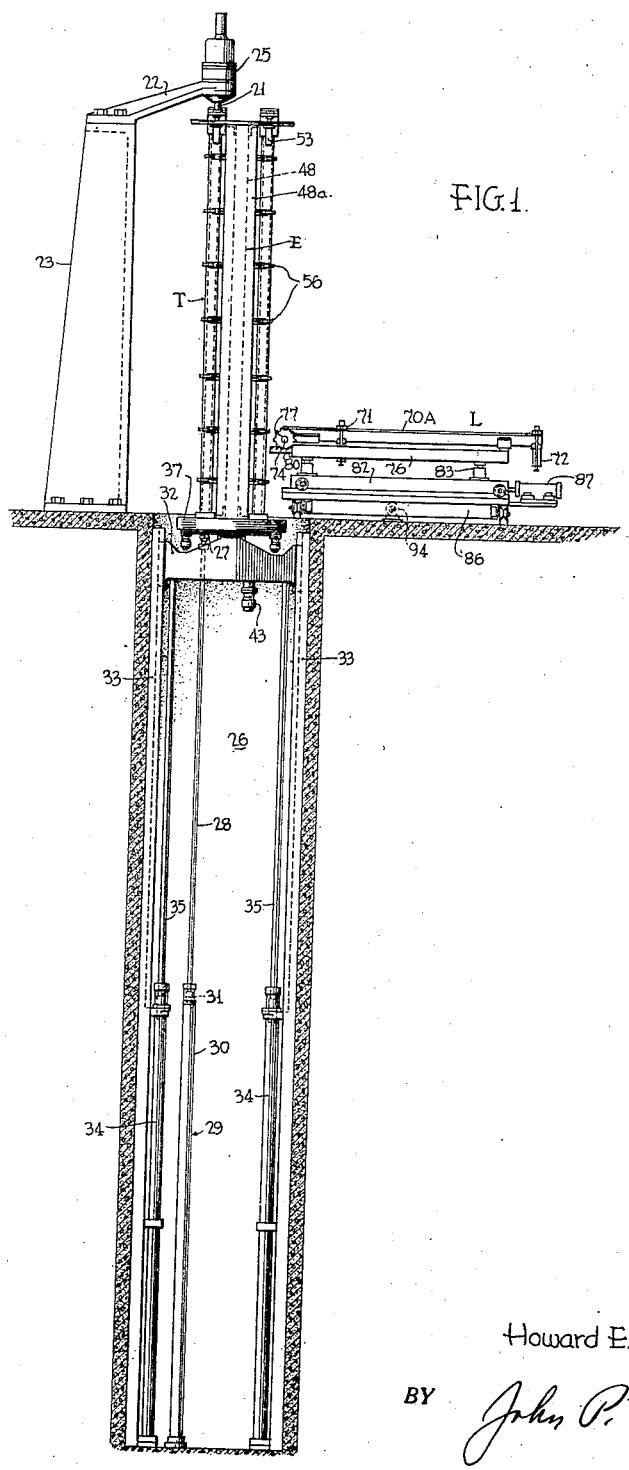

Figures 8 to 15, inclusive, are diagrammatic views showing various steps in the operation of the loading mechanism; and Figures 16 to 22, inclusive, are diagrammatic views showing various steps in the operation of the elevating mechanism.

Referring to the accompanying drawings in which like numerals refer to like parts throughout the several views, the work handling apparatus of the present invention is shown and described in connection with mechanism for heat treating of relatively long steel tubing, that is, tubing up to fifty feet in length and of great weight, wherein the interior surfaces thereof are hardened. The apparatus shown includes mechanism for heating and quenching the tubing, mechanism for progressively moving the tubing relative to the heating and quenching operation and mechanism for loading the tube-moving mechanism, all so correlated as to facilitate handling and heat treating the tubing in a vertical position.

In carrying out the heat treating operation, an electromagnetic induction heating apparatus is employed, such apparatus including an inducing head 20 supported on a rigid arbor 21 of a length corresponding to that of the tubes to be heat treated suspended from a bracket 22 projecting laterally from a suitable upwardly extending base 23. The bracket 22 supports a transformer mechanism 25 which supplies high-power high-frequency electrical current to the inducing coil of the head 20.

Since the particular design of the inducing head, its supporting arbor and the transformer mechanism does not form a part of the present invention, these parts have not been described in detail. However, for a full understanding of a suitable inducing head and transformer mechanism reference may be had to my U. S. Letters Patent Numbers 2,208,607 reissued April 7, 1942, as Re. 22,064, and 2,223,902, dated July 23, 1940, and December 3, 1940, respectively. In the present instance, however, the inducing head 20 and arbor 21 are stationary and do not move longitudinally during the heat treating operation as in said Patent No. 2,208,607.

Due to the extreme height of apparatus essential in order to treat tubes of great length, a portion of the apparatus is arranged within a pit 26 underlying the suspended inducing head 20, this pit, of necessity, as will be later apparent, being of a depth at least twice that of the length of the tubing to be heat treated.

The quenching apparatus comprises a quench discharging head 27 mounted upon the upper end of a supply tube 28 which is actuated from a lowermost position to an uppermost position into registering engagement with the bottom end of the inducing head 20 by means of hydraulic mechanism 29 comprising a fluid-pressure cylinder 30 and a piston 31 attached to the supply tube 28. It will be seen from the drawings, particularly Figure 4, that the inducing head 20 and quench head 27 are in axial alignment and that in the lowermost position of the quench head the two heads are separated a distance sufficient to clear the ends of the tube T. In Figure 2, the quench head 27 is shown in its uppermost position of engagement with the end of the inducing head 20.

A tube to be heat treated is arranged vertically in axial alignment with the separated heads 20 and 27, and is then raised to the position shown in Fig. 2 with the heating head extending through the tube to positon the head 20 below the lower end of the tube, after which the quench head 27 is moved upwardly into registering engagement with the inducing head 20. Then, the tube is moved downwardly at a desired rate of travel during which time electrical energy is supplied to the inducing head from the transformer and quenching fluid is supplied to the quench head 27. The tube is thus heated to a hardening temperature and quenched during its downward travel. Also, in order to effect uniform treatment of the inner surface, the tube is rotated during its downward travel.

The elevating mechanism and means for supporting the tubes during the heat treating operation comprises a main platform 32 arranged for vertical movement within the pit 26 between vertical guideways 33 secured to the opposite side walls of the pit, as shown in Figures 3 and 4. The platform 32 is raised and lowered within the pit 26 by any suitable means such as the spaced vertical hydraulic cylinders 34 having reciprocable piston rods 35 secured at their upper ends to the platform 32, as shown in Figures 2 and 4.

Referring to Figure 4, the quench tube 28 extends through the platform 32 and is guided thereby through the medium of a suitable bushing 36. A horizontal rotary table 37 is mounted for rotation on an upwardly extending central hub 38 of the platform 32 through the medium of end thrust ball bearings 39. Rotation of the table 37 is effected by means of a vertical shaft 40 keyed to the table 37 and extending downwardly through the platform hub 38 and provided with a drive gear 41 which is driven by a gear train 42 from a suitable electric motor 43. The motor 43 is secured to a bracket 44 which is mounted on the under side of the platform 32. The table 37 is arranged to support two tubes at a time and, in order to support the tubes in a vertical position, upper and lower tube supports are provided. The lower tube supports comprise diametrically opposed annular chucking devices 44 adapted to closely engage the ends of the tubes in surrounding relation, each of these chucking devices being carried by an annular turntable 45 rotatably supported upon the table 37. Each turntable is provided with a toothed periphery which is meshed with a drive pinion 46 driven by a suitable electric motor 47.

The rotary table 37 is provided with an axially extending rigid standard 48 and side standards 48a radially spaced from the standard 48, a cross piece 49 being rigidly secured to the upper ends of the standards 48 and 48a. This cross piece carries the diametrically opposed upper tube supports, each of which comprises an annular chucking device 50 axially aligned with the corresponding lower chucking device 44. Each chucking device 50 is axially slidably mounted in the cross piece 49 and is rotatably suspended through an end thrust bearing 51 from an annular member 52. In order to axially slide each chucking device 50, fluid-pressure motors comprising hydraulic cylinders 53 and pistons 54 are provided, as shown in Figure 6, the rods of the pistons 54 being rigidly connected to the member 52. It is thus seen that for each lower chucking device 44 an axially opposed chucking device 50 is provided, the upper chucking device 50 being axially reciprocable so that by reciprocating the same axially away from the lower chucking device 44 a tube T can be vertically disposed with its lower end closely confined within the same, after which the upper chucking device 50 is reciprocated toward the lower device to closely engage the upper end of the tube T. It is to be noted also that each pair of upper and lower chucking devices are rotatably supported whereby the tube T may be rotated.

It is thus seen that the elevating and supporting mechanism just described is arranged, as shown in Figure 4, to support two tubes in diametrically opposed parallel relation and that the axis of the rotary table 37 is offset with respect to the common axis of the inducing and quench heads 20 and 27 so that one of the tubes T so supported is axially aligned with the heads 20 and 27. Axial openings 55 are provided in the table 37 in axial alignment with the supported tubes and these openings and the central openings of the chucks 44 and turntables 45 are of sufficient diameter to permit the quench head 27 to move therethrough into the particular tube T to be heat treated. The rotary table 37 and its rotating means thus provides an indexing fixture.

In view of the great length of the tubes which are to undergo heat treatment, it is extremely desirable to provide means for preventing transverse deflection intermediate their ends in order to maintain them truly coaxial throughout their entire length with the inducing and quench heads and thereby insure against contact between the walls thereof with the peripheries of the inducing and quench heads during relative movement between such heads and the tubes. In order to maintain rigidity of the tubes intermediate their ends, a series of roller clamps 56 are secured to each side of the vertical standard 48. Referring to Figures 3 and 4, each of these clamps may comprise a base 57 secured to the standard 48 and a pair of spaced clamp arms 58 pivoted to the base 57 intermediate their ends and adapted to be actuated toward and away from each other by means of a fluid-pressure motor 59. The ends of the arms 58 and the base 57 are provided with rollers 60 which when the clamp is closed, as in Figure 3, engage the tube at three spaced points, the rollers of the arms 58 tending to urge the tube toward the single roller of the base 57. The axes of the rollers 60 of course are parallel to the axis of the supported tube and such rollers of the series of clamps, while maintaining the tube against transverse deflection, permit the tube to freely rotate.

Figures 16 to 22, inclusive, are diagrammatic views which illustrate the sequence of operations of the tube elevating mechanism during the heat treating operation within a complete cycle. Figure 16 illustrates a condition in which the work elevating mechanism E has moved to its uppermost position. At this position with the heating head 20 positioned below the lower end of the tube the tube T at the left is about to be heated and quenched. A new tube NT has been inserted at the right in the elevating mechanism E. The quench head 27 is in its elevated position.

Figure 17 illustrates the next point in the cycle of operation wherein the elevating mechanism E is moving toward its lowermost position, which is shown in Figure 18. Thereupon, the elevating mechanism E has been rotated to position the new tube NT at the left in position for heat treatment and the treated tube T in position for unloading when elevated. Figure 19 illustrates the elevating mechanism as being in its uppermost position, the tube T being in position to be removed and replaced by a third untreated tube NT—1. In this position the heating and quenching heads are ready to begin a heat treating operation when delivering the tube NT. Figure 20 is a view corresponding to Figure 17 showing the elevating mechanism as approaching its lowermost position at the end of the treating operation. In Figure 21 which corresponds with Figure 18, the quench head has been lowered to permit rotation of the work holder to locate the treated tube NT at the side for subsequent unloading and to position the third tube NT—1 in coaxial alignment with the inducing and quench heads 20 and 27. Figure 22 corresponds with Figure 19, the third tube NT—1 being ready for treatment and the second tube NT being in a position to be removed.

The elevating mechanism just described provides a simple and efficient expedient for handling tubes of great length and weight and, since it is arranged to carry two tubes simultaneously during its elevating and lowering movements, the time required between successive heat treating operations is very materially reduced since the mechanism is unloaded and loaded after each upward movement of the elevating mechanism and before the downward stroke of the same.

Referring to Figures 2, 3, 4 and 5, there is shown the improved mechanism of the present invention for loading and unloading the elevating mechanism E each time it reaches its uppermost position. Steel pipes up to fifty feet in length and of diameters ranging up to, for example, eleven inches or more are of such weight that it is impossible to manually upright them for loading in the elevating mechanism E. Accordingly, the loading mechanism of the present invention is so arranged as to provide for the most efficient mechanical handling of the tubes.

This mechanism is arranged with parallel V-shaped tube troughs 70A and 70B provided with pivoted clamp arms 71 which are actuated into and out of clamping position with a tube T contained within the trough 70, as shown in Figure 7, by means of a hydraulic motor 72 carried by the trough 70. These clamps are of such strength and construction as to be able to securely hold the clamped tube in a vertical position. The ends of the troughs 70 adjacent the heat treating apparatus are provided with rigid brackets 73, each of which is rigidly secured to a shaft 74. The shaft 74 is journalled in bracket supports 75 rigidly secured to a supporting frame 76 and is provided at its ends with toothed gears 77. The frame 76 carries fixed hydraulic cylinders 78 having fluid-actuated piston 79 therein, the piston rods 80 of which are in the form of racks in mesh with the gears 77 so that upon reciprocation of the pistons 79 within the cylinders 78 the racks 80 rotate to cause the shaft 74 which is rigidly secured to the trough brackets 73 to move the troughs 70A and 70B from the horizontal position shown in solid outline in Figure 2 to the vertical loading and unloading position shown in broken outline. In the horizontal position, the troughs are supported at their free ends on the frame 76 as indicated at 81 in Figure 2.

The frame 76 is supported on a second frame 82 for vertical movement, so that the tubes can be raised or lowered relative to the lower chucks 44, through the medium of hydraulic motors 83 suitably located on the second frame 82.

Provision is also made to move the tubes supported in the troughs 70A and 70B in a horizontal direction toward and away from the axis of the upper and lower tube chucks. The second frame 82 accordingly is provided with a plurality of guide rollers 84 which are rotatably guided on spaced tracks 85 carried by a third frame 86. The horizontal movement of the frame 82 is effected through a hydraulic motor 87, the cylinder 88 of which is carried by a support 89 secured to the third frame 86. The piston rod 90 of the motor 87 is rigidly secured to the second frame 82 so that upon actuation of the piston 91 within the cylinder 87 the frame 82 can be horizontally moved on the tracks 85 toward and away from the elevating mechanism E.

Since in the operation of the apparatus, a heat treated tube is removed from the elevating mechanism E and a tube to be heat treated is placed in the elevating mechanism before the elevating mechanism is lowered into the pit 26, a means is provided for horizontally shifting the troughs 70A and 70B relative to the elevating mechanism to move each trough into unloading and loading positions.

In order to accomplish this, the third frame 86 is provided with guide rollers 92 which are rotatably guided on spaced tracks 93 extending at right angles to the tracks 85. A suitable hydraulic motor 94 is secured to the foundation of the apparatus and has its reciprocable piston rod 95 secured to the third frame 86 so that upon reciprocation of the piston rod 95 the frame 86 is moved along the tracks 93.

Figure 8:
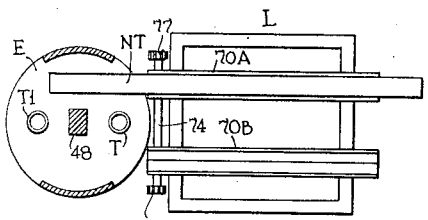

In Figures 8 to 15, inclusive, I have diagrammatically illustrated the sequence of loading and unloading operations, the loading mechanism being designated "L." Figure 8 illustrates the step in the sequence wherein the tube troughs are in a horizontal position, the trough 70A being loaded with an untreated tube NT and the trough 70B being empty.

Figure 12:
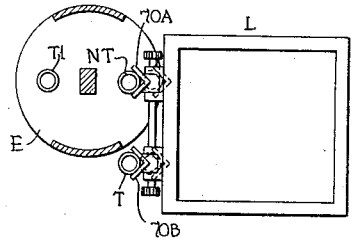
Figure 9:
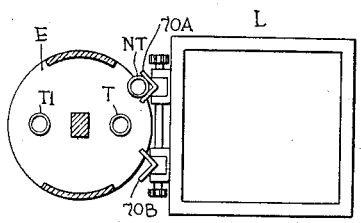
Figure 10:
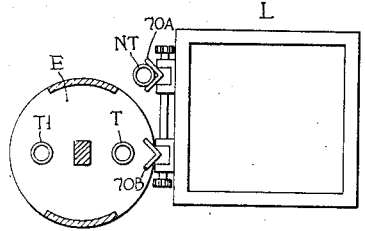
Figure 14:
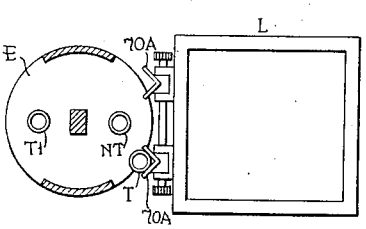
Figure 11:
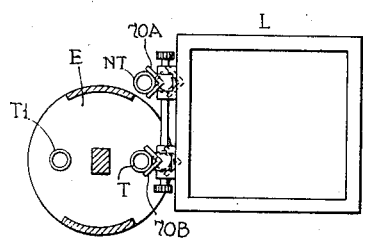

By actuating the hydraulic motors 78, the troughs 70A and 70B are tilted to the upright position shown in Figure 9. Then, the motor 94 is actuated to shift the tube troughs to position the trough 70B adjacent the tube T which has been heat treated and ready to be removed from the elevating mechanism E, as indicated in Figure 10. Next, the motor 87 is actuated to move the loading mechanism L toward the elevating mechanism E to engage the tube T with the trough 70B, whereupon the clamps 71 are actuated by the motors 72 to clamp tube T and the clamps 56 of the elevating mechanism E are released through the operation of motors 59. This position is shown in Figure 11. After the upper chuck 50 has been raised (Figure 2) the troughs are raised a sufficient amount by actuation of the motors 83 so that the tube T will clear the lower chuck 44. Then, the loading mechanism L is shifted by motor 94 to position tube NT in trough 70A for loading in the chucks 44 and 50. This position is shown in Figure 12.

Now, with reference to Figures 2 and 6, the hydraulic motors 83 are actuated to lower the tube NT so that its lower end is positioned within the lower chuck 44. After this, the motors 53 (Figure 6) are actuated to lower the upper chuck around the upper end of the untreated tube NT, and then the motors 59 (Figure 3) are actuated clamping the tube between the roller 60, after which the motors 72 for the trough clamps 71 are actuated to release clamps 71 from clamping engagement with the tube NT.

Figure 13:
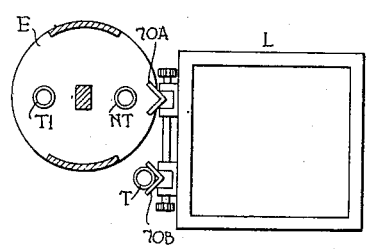
Figure 15:
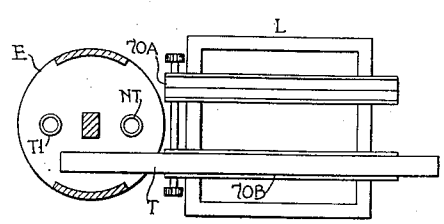

The motor 87 then upon actuation withdraws the frame 82 to the position shown in Figure 13. Subsequently, motor 94 actuates the frame 86 to the position shown in Figure 14, whereupon the motors 78 lower the troughs 70 onto the frame 76 as indicated in Figure 15. The tube T is then removed from the trough 70B, upon release of clamps 71, by any suitable means such as a suitable crane and a new untreated tube (not shown) is placed in trough 70A and clamped in position. The troughs 70 are then moved to the upright position, the troughs 70B being empty.

The elevating mechanism E is then lowered as previously described, to heat treat the tube which is in alignment with the heating and quenching heads rotated to align the untreated tube NT for heat treatment and the treated tube for unloading, and then elevated. In order to permit unrestrained expansion of the portions of the tube underlying the clamps 56 and undergoing immediate heat treating, the clamps 56 are arranged to be progressively opened and closed as they are moved past the heating head 20. In other words, each clamp 56 is opened during the period the portion of the tube underlying the same is being heated. Upon raising the work support, the loading mechanism L is moved to a position corresponding to that of Figure 11 to align the trough 70B into clamping position with the previously heat treated tube T—1 for removal from the elevating mechanism, the same as in the case of the tube T.

From the foregoing it is seen that I have provided mechanism for advantageously handling tubes of great length on which work is to be performed. The loading and elevating mechanism are so designed and correlated in their respective movements as to eliminate all unnecessary movements and to minimize time in loading and unloading between successive operations.

Some portions of the apparatus have been more or less diagrammatically illustrated for the sake of clarity of showing, a detailed showing of such parts not being necessary for a clear understanding of the invention. I have not shown the control circuits for the electrical and hydraulic apparatus or the timing mechanism for effecting the operation of such apparatus in predetermined sequence. However, such controls may be of any suitable character well known to those skilled in the art. While the loading apparatus has been described in connection with heat treating apparatus it is to be understood that it is equally applicable to any apparatus for performing work, such as machining, upon relatively long tubes or cylindrical articles.

It is to be understood that various changes may be made in the detailed construction and arrangement of the various parts described without departing from the spirit and substance of the present invention, the scope of which is defined by the appended claim.

What is claimed is:

In an apparatus for performing work upon elongated work-pieces including an indexable work holder having spaced means for supporting elongated articles in a vertical position, and means for indexing said holder to successively move said supporting means and the articles supported thereby from a loading and unloading station to a work treating station and thence to the loading and unloading station; loading and unloading mechanism comprising a shiftable carriage having spaced parallel supports, each for holding an elongated article in a vertical position, and means for shifting said carriage first to position one of said supports adjacent said loading and unloading station to receive a treated article from said work holder and then to position the other of said supports adjacent said loading and unloading station in position to deliver an untreated article to said work holder, said mechanism including article clamping means for each said support, and motor means for each said clamping means for actuating said clamping means to clamp an article as held in said work holder before removal therefrom and to disengage an article after disposition in said work holder, and motor means for moving said carriage away from and toward said work station to respectively remove an article from said work holder and dispose an article in said work holder.

HOWARD E. SOMES.